H. L. OGG.
SPEED REGULATOR.
APPLICATION FILED FEB. 17, 1913.
1,106,156.
Patented Aug. 4, 1914.
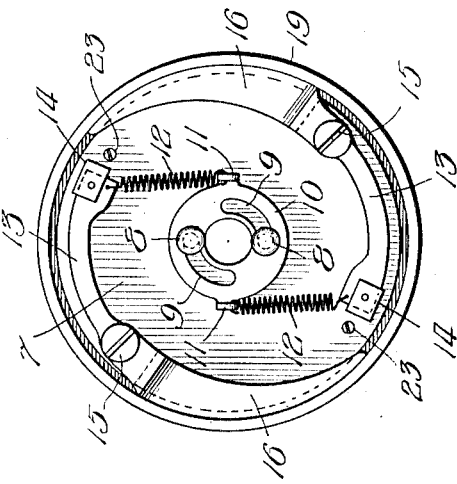
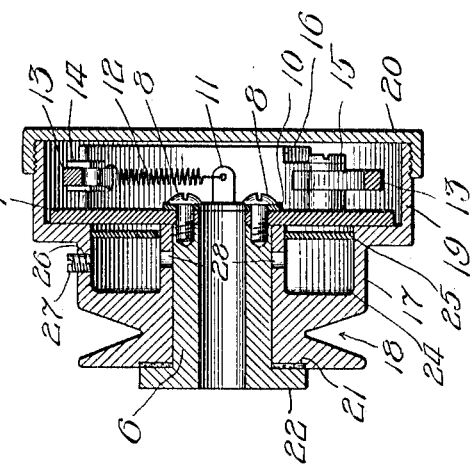
Witnesses:
Harry S. Gaither
Gustav Drews
Inventor:
Harry L. Ogg
by Wallou P. Lane Atty

UNITED STATES PATENT OFFICE.

HARRY L. OGG, OF NEWTON, IOWA.

SPEED-REGULATOR.

1,106,156.      Specification of Letters Patent.      Patented Aug. 4, 1914.

Application filed February 17, 1913. Serial No. 748,818.

*To all whom it may concern:*

Be it known that I, HARRY L. OGG, a citizen of the United States, and residing at Newton, in the county of Jasper and State of Iowa, have invented certain new and useful Improvements in Speed-Regulators, of which the following is a specification.

This invention relates to speed regulators and aims especially to provide a voltage regulator wherein the transmission of the speed to the dynamo shaft from any suitable external source of power will be controlled to transmit a substantially equal rate of speed. To this end the dynamo shaft is driven by frictional contact, and this frictional contact is broken by centrifugal force when the limit of speed is surpassed.

An object of the invention is to provide means for adjusting the device to various rates of speed.

Another object of the invention is to provide a device simple of construction, easily assembled and one in which the parts can easily be replaced when desired.

It is also an object of the invention to provide an efficient lubricating means.

These and other features, capabilities and advantages of the invention will become more apparent from a detail description of the drawings in which—

Figure 1 is a cross-section in elevation of an embodiment of the present invention, and Fig. 2 is a top plan view of the same with the cover removed.

In the drawings the device is shown as having a sleeve member 6 which may be fixed on a dynamo shaft as by forcing the same thereon, by feathering or in any other suitable manner. This sleeve has a disk 7 secured to it by screws 8, 8. These screws pass through annular slots 9, 9 of a small disk member 10 shown in Fig. 2. This small disk 10 has lugs 11, 11 on its periphery one diametrically opposite the other. To each of these lugs 11, 11 is connected a spring 12, one for each lug which is attached to one end of a lever member 13. These lever members 13, 13 are identical and therefore, it will suffice to describe but one of them. At the end of the lever member 13 to which spring 12 is attached, a weight 14 is secured, made of any suitable metal or the like. The lever 13 is pivoted to disk 7 at substantially the middle 15 of the same. The other end of the lever 13 forms a shoe member 16 composed of fiber or the like.

A housing member 17 incloses the forementioned which housing has an annular groove 18 in which a belt travels. The other portion 19 of the housing is cup-shaped in which the disk 7 operates. The outer edge of the cup-shaped portion 19 is threaded to receive the inner screw-threaded rim of a cover member 20. At the other end of the housing member is an annular recess 21 surrounding the inner opening of the housing member. In this recess 21 a member composed of felt or other suitable material is secured which lies against a flange portion 22 of the sleeve member 6.

The operation of the device is substantially as follows: The device is attached to the end of a dynamo shaft by securing sleeve member 6 over the same. As the housing member 17 is rotated by a belt or the like traveling in groove 18, the inner periphery of its cup-shaped portion 19 which is in contact with the shoe members 16, 16, will carry these shoe members with it. And these shoe members 16, 16, being connected to travel with the sleeve member 6, which is secured to the dynamo shaft, will in turn rotate the dynamo shaft.

When the speed of the housing member surpasses the speed limit to which the device is adjusted, by centrifugal force, the weights 14, 14 are thrown outward, and the shoes withdrawn from the housing member thereby breaking the frictional contact. To limit the outward movement of the weights 14, 14, screws 23, 23 are secured in disk 7, so positioned that the inner surfaces of the shoe members 16, 16 will abut against the same. As soon as the speed of the dynamo shaft is reduced, the springs 12, 12 will again draw in the weights 14, 14 and thereby again press the shoe members 16, 16 against the housing member.

To adjust the device to control various speed limits, the annular disk 10 is turned around the screws 8, 8 by means of annular slots 9, 9, thereby to increase or decrease the tension of the springs 12, 12.

To provide an efficient lubricating means for the device, the housing 17 is hollowed out between the cup-shaped-portion 19 and pulley groove 18, opening into the cup-shaped portion forming an annular chamber 24. This opening is closed by suitable solder 25. Into this annular chamber, hard grease or other suitable lubricant may be provided through opening 26, having a screw 27 to close the same. To feed into the sleeve 6, openings 28, 28 are provided.

Obviously when the dynamo is supplied with electric currents from any suitable external source, to act as a motor, the speed which it transmits to furnish mechanical power, can be regulated by this same device.

While there is herein shown and described only one embodiment of the invention it is to be understood that various changes and modifications may be made by those skilled in the art without departing from the scope of the invention as defined in the appending claims.

Having thus described my invention what I claim as new and desire to secure by Letters Patent is:

1. A speed regulator comprising a sleeve, a flange formed integral with one end of the sleeve, a disk detachably secured to the other end of the said sleeve, friction members pivotally secured to the outer face of said disk, a pulley loosely mounted upon said sleeve between the integral flange and the disk, a housing carried by said pulley for inclosing said disk and friction members, means for normally holding said friction members into engagement with the said housing and means for withdrawing said friction members by centrifugal force when a predetermined speed is surpassed.

2. A speed regulator comprising a sleeve, a disk member, means for detachably connecting said disk member to one end of said sleeve, friction members pivotally secured to one face of said disk, adjacent the periphery thereof, a circular plate adjustably secured to said disk member, apertured projections formed integrally with the plate and lying diametrically opposite, coil springs connecting said apertured projections with one end of each of said friction members, a grooved pulley loosely mounted upon said sleeve, a housing projecting from one end of said pulley for inclosing said disk member and friction members, said coil springs adapted to normally hold said friction members into engagement with the said housing and means whereby the same will be withdrawn from the housing by centrifugal force.

3. A speed regulator comprising a sleeve, a disk member, means for detachably connecting said disk member to said sleeve, a circular plate, the said circular plate having a pair of arcuate slots formed therein, the said means for holding the disk to the sleeve adapted to extend through the slots whereby the said plate may be adjusted, friction members pivotally secured to said disk, a pulley slidably mounted upon said sleeve, a housing carried by said pulley inclosing said disk member and said friction members, means connecting said friction members with said plate member for normally holding the friction members into engagement with said housing, and means carried by the friction members for withdrawing the same by centrifugal force when a predetermined speed is surpassed.

4. A speed regulator, comprising a sleeve, a disk member, a pair of set screws for detachably connecting said disk member to one end of said sleeve, a circular plate having slots formed therein, the said set screws extending through the said slots whereby the plate may be adjusted, friction members pivotally secured upon one face of said plate, an annular flange formed integral with the opposite end of said sleeve, a pulley loosely mounted upon said sleeve between said annular flange and disk member, a housing carried by said pulley for inclosing said disk member and friction members, means connecting said friction members with said plate for normally holding the said friction members into engagement with the said housing, means for withdrawing the said friction members by centrifugal force and means carried by said disk member whereby the inner movement of said friction members will be limited.

In witness whereof, I hereunto subscribe my name to this specification in the presence of two witnesses.

HARRY L. OGG.

Witnesses:
 GUSTAV DREWS,
 M. F. COUGHLIN.

---

Copies of this patent may be obtained for five cents each, by addressing the "Commissioner of Patents, Washington, D. C."